United States Patent
Murata et al.

[11] Patent Number: 6,153,828
[45] Date of Patent: Nov. 28, 2000

[54] SUPPORTING DEVICE FOR WIRING AND PIPING OF INDUSTRIAL ROBOT

[75] Inventors: Yuji Murata; Isao Arai, both of Takaoka; Nobutake Fukayama, Toyamaken; Kiyoshi Kanitani, Toyama, all of Japan

[73] Assignee: Nachi-Fujikoshi Corp., Toyama, Japan

[21] Appl. No.: 09/188,290

[22] Filed: Nov. 9, 1998

[30] Foreign Application Priority Data

Nov. 7, 1997 [JP] Japan ..................................... 9-320509

[51] Int. Cl.[7] ....................................................... H02G 3/18
[52] U.S. Cl. ............................................ 174/50; 174/65 R
[58] Field of Search ........................ 174/50, 50.6, 65 R, 174/84 R

[56] References Cited

U.S. PATENT DOCUMENTS

| | | | |
|---|---|---|---|
| 4,224,960 | 9/1980 | Nederman | 137/355.23 |
| 4,659,279 | 4/1987 | Akeel et al. | 414/680 |
| 4,812,132 | 3/1989 | Gunnarsson | 439/164 |
| 4,951,677 | 8/1990 | Crowley et al. | 128/662.06 |
| 5,174,515 | 12/1992 | Meier | 242/54 R |
| 5,669,432 | 9/1997 | Nisenson et al. | 160/307 |
| 5,924,974 | 7/1999 | Loffler | 600/303 |

FOREIGN PATENT DOCUMENTS

| | | |
|---|---|---|
| 2-100892 | 4/1990 | Japan . |
| 5-006077 | 2/1993 | Japan . |
| 9-150393 | 6/1997 | Japan . |

*Primary Examiner*—Kristine Kincaid
*Assistant Examiner*—Adolfo Nino
*Attorney, Agent, or Firm*—Venable; Robert J. Frank; Leo J. Jennings

[57] ABSTRACT

An improved supporting device for wiring of electric cables for an industrial robot is provided which is adapted to house an increased number of electric cables and pipes without making the robot body of a high vertical height or large-sized. The supporting device has plurality of circular spaces divided by axial partition walls each extending along a concentric circle with respect to the rotation axis of the rotary base. A plurality of bundles containing a plurality of electric cables and/or pipe(s) are so installed in each of the circular spaces that each one end of the bundles is secured on the interior wall of the base and then, each bundle extends halfway along a center of one of the circular spaces, and then is turned back to form an U-shaped configuration and returns along a center of opposite circular spaces of the rotary base, and each of the other end of bundles is secured on the rotary base.

3 Claims, 4 Drawing Sheets

SUPPORTING DEVICE FOR WIRING AND PIPING OF INDUSTRIAL ROBOT

BACKGROUND OF THE INVENTION

1. Field of the Invention

The present invention relates to a supporting device for wiring and piping installed in a space between a base and a rotary base rotatably mounted on the base of an industrial robot.

2. Description of the Related Art

Many conventional supporting devices for wiring of electric cables for industrial robots are installed in interior spaces of the robots for the reasons to keep both a good appearance and free spaces around the industrial robot, and to protect the electric cables. For example, Japanese examined utility model publication No.05006077 and Japanese unexamined patent publication No.02100892 discloses a conventional supporting device for wiring of electric cables for the industrial robot shown in FIGS. 7 and 8. The FIG. 8 is a cross sectional view along the line D—D of FIG. 7.

In FIGS. 7 and 8, the supporting device for wiring of electric cables includes a base 1 having a first space 20 and a rotary base 2 having a second space 21 and rotatably mounted on the base 1. The supporting device includes a pair of elastically flexible conduits 51, 52 each housing a bundle 42 of a plurality of electric cables 42a. The conduits 51,52 are so installed in each of the circular spaces 20,21 between the base 1 and the rotary base 2 on both half sides of each circular space so that they extend in a symmetrically way with respect to a crossing line 25 passing on the rotation axis 0 of the rotary base 2.

Each one end of the conduit 51,52 is secured on the interior wall of the base 1 by a clamp 9 and each conduit 51,52 extends along a halfway in the circular space 20 of the base 1, and then turned back to form an U-shaped configuration 44 and returns along the halfway in the circular space 21 of the rotary base 2 contactably on a ceiling wall of the rotary base 2, and the other end of each conduit 51,52 is secured on the rotary base 2 by a clamp 10. In FIG. 7, a reduction gear 4 is secured to the base 1 and coupled to a driving shaft 24 of a motor 3 secured to the rotary base 2.

By such an arrangement, when the rotary base 2 rotates to one direction, the bundle 42 of a plurality of electric cables 42a housed in one of the conduit 51,52 is made to go forward while bended or turned up with an adequate curvature, further, at the same time, the bundle 42 housed in the other conduit is made to go backward while similarly bended or turned up. This results that the two conduit 51,52 do not interfere with each other, and the bundles 42 housed in the conduits are pressed with a stable load and prevents from wiring troubles.

Another Japanese unexamined publication No.09150393 disclose an arrangement of cables so that each cable draw port is arranged along the rotating direction of a rotary base to prevent cables to fold with each other in a vertical direction.

Year by year, numbers of electric cables and pipes for air or water or the like to be installed in industrial robots are continuously increasing. For example, in an arc spot welding robot performing a predetermined welding work using an end effector such as welding guns gripped by its wrist, a servo motor is recently used to drive an electrode tips in place of an air cylinder. This results that power lines and control lines and pipes for air or water or the like for the servo motors must be added. Further, cables and pipes both for torque-load sensors of torque-load control as well as for vision sensors used in handling robots also increase the numbers of the electric cables and pipes.

However, in the above conventional supporting device for wiring of electric cables shown in FIGS. 7 and 8, when the numbers of the electric cables and pipes increases, the external diameter of the elastically flexible conduit housing electric cables and pipes also increases, resulting that the radius of curvature of the U-shaped configuration 44 increases, and the base and the rotary base must have high vertical heights and large-sized bodies. This also applies to the device of the Japanese unexamined publication No.09150393, because the base and rotary base must have high vertical heights and large-sized bodies to prevent cables and pipes to fold with each other in a vertical direction. These conventional devices inevitably resulted that the robot bodies must have high vertical heights and large-sized.

SUMMARY OF THE INVENTION

It is therefore an object of the present invention to provide a supporting device for wiring and piping installed in a space between a base and a rotary base rotatably mounted on the base of an industrial robot which is adapted to house an increased number of the electric cables and pipes without making the robot body including its base and rotary base of a high vertical height and of a large-sized.

It is another object of the present invention to provide a supporting device for wiring of electric cables of an industrial robot which is adapted to protect the electric cables and pipes so that the neighboring conduits housing the bundles do not interfere with each other while the rotary base rotates, and the bundles housed in the conduits are pressed with a stable load and prevented from wiring troubles.

According to the present invention, there is provided a supporting device for wiring and piping installed in an industrial robot including a base having a first space and a rotary base having a second space and rotatably mounted on the base;

wherein the first space is divided into a plurality of circular spaces by at least one first axial partition wall having a portion extending along a concentric circle with respect to the rotation axis of the rotary base and one end of which is fixed on a bottom wall of the base; and the second space is divided into a plurality of circular spaces by at least one second axial partition wall oppositely disposed with respect to the first axial partition wall via a small space therebetween and one end of which is fixed on a ceiling wall of the rotary base; and a plurality of bundles containing a plurality of electric cables and/or pipe(s) so installed in each of the circular spaces so that the one end of each bundle is secured on the interior wall of the base and each bundle extends halfway along a center of one of the circular spaces of the base, and then is turned back to form an U-shaped configuration and returns along a center of the opposite circular space of the rotary base contactably on the ceiling wall therefor, and the other end of each bundle is secured on the rotary base.

By such an arrangement, since the first and second spaces are each divided into a plurality of circular spaces by the axial partition wall, the numbers of cables and/or pipe(s) installed into each circular space are similarly divided into small numbers, resulting that the radius of curvatures of the turned back portions forming U-shaped configurations in the first and second spaces can be made small, thereby there is provided a supporting device which is adapted to house an increased number of electric cables and pipes without making the robot body including its base and rotary base to have a high vertical height and a large-size.

Preferably each bundle containing the plurality of electric cables and/or pipe(s) is housed in a flexible conduit respectively. By this arrangement, bundles containing the plurality of electric cables and/or pipe(s) are protected by the flexible conduit.

More preferably, each bundle containing a plurality of electric cables and/or pipe(s) is housed in a coilspring conduit respectively, further, each of the coilspring conduits are so arranged on both half sides of each circular space that they extend in a symmetrically way with respect to a crossing line passing on the rotation axis of the rotary base. As a flexible conduit, a plastic tube having a sufficient elasticity against bending movements and a strong durability against friction may be used. By this arrangement, the half of the coilspring conduits are made to go forward while bended or turned up with an adequate curvature, at the same time the rest coilspring conduits are made to go backward while similarly bended or turned up, resulting that the neighboring coilspring conduits housing the bundles do not interfere with each other while the rotary base rotates, and the bundles housed in the coilspring conduits are pressed with a stable load and prevented from troubles arising out of wiring and piping.

DETAILED DESCRIPTION OF THE PREFERRED EMBODIMENTS

Figure 1:
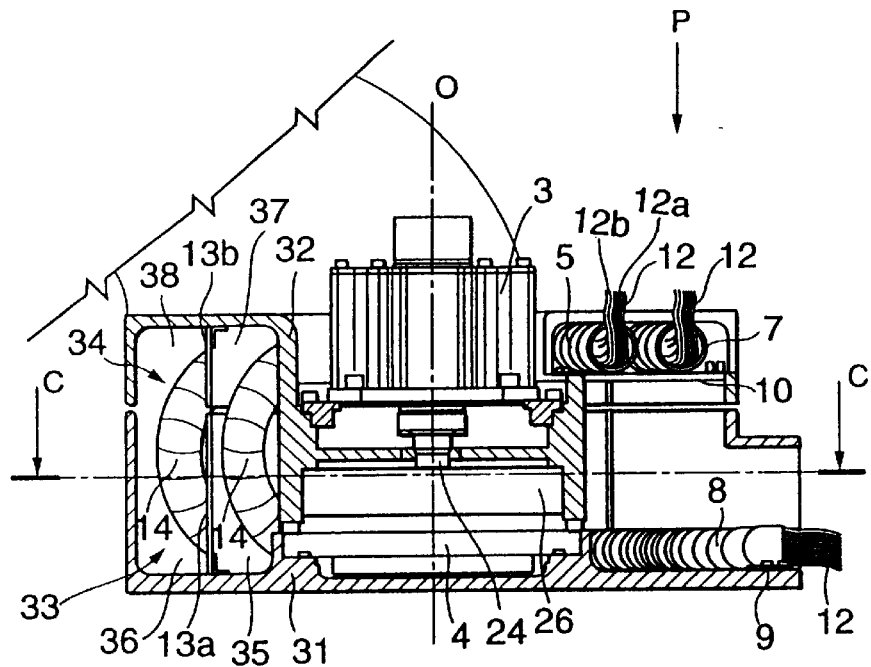
FIG. 1 is an elevational partial cross section view showing a preferred embodiment of the supporting device for wiring and piping of an industrial robot.

This invention will he described in further detail by way of example with reference to the attached drawings. As shown in FIGS. 1 to 4, an industrial robot includes a base 31 having a first space 33 and a rotary base 32 having a second space 34 and rotatably mounted on the base 31. A reduction gear 4 is secured to the base 31 and coupled with a driving shaft 24 of a motor 3 secured to the rotary base 32. The outer housing 26 of the reduction gear 4 forming its output shaft is also secured to the rotary base 32 and when the motor 3 rotates the shaft 24, rotary base 32 is rotated. On the rotary base 2, robot arms not shown are mounted.

The supporting device of the present invention comprises a plurality of circular spaces 35,36,37,38 divided by first and second axial partition walls 13*a*, 13*b* each having portion 39 (FIG. 4) extending along a concentric circle with respect to the rotation axis 0 of the rotary base 32 at its center over about 280 degree and each of the ends of which are fixed on a bottom wall of the base 31 and on a ceiling wall of the rotary base 32 respectively. The first axial partition wall 13*a* fixed on the bottom wall of the base 31 divides the first space 33 into two circular spaces 35, 36, and the second axial partition wall 13*b* fixed on an interior ceiling wall of the rotary base 32 divides the second space 34 into two circular spaces 37, 38.

Further, the supporting device comprises a plurality of bundles 12 containing a plurality of electric cables 12*a* and/or pipe(s) 12*b* each respectively connected with a robot controller and an end effector such as a welding gun not shown either. The bundles 12 may contain a plurality of electric cables 12*a*, a plurality of electric cables 12*a* and a pipe 12*b*, a plurality of electric cables 12*a* and a plurality of pipes 12*b*, or a plurality of pipes. The bundles 12 are housed in coilspring conduits 5, 6, 7, 8 respectively to protect the bundles 12 containing a plurality of electric cables 12*a* and/or pipe(s) 12*b*. However, the coilspring conduits may be flexible conduits. Further, as a flexible conduit, a plastic tube having a sufficient elasticity against bending movements and a strong durability against friction may be used.

Figure 2:
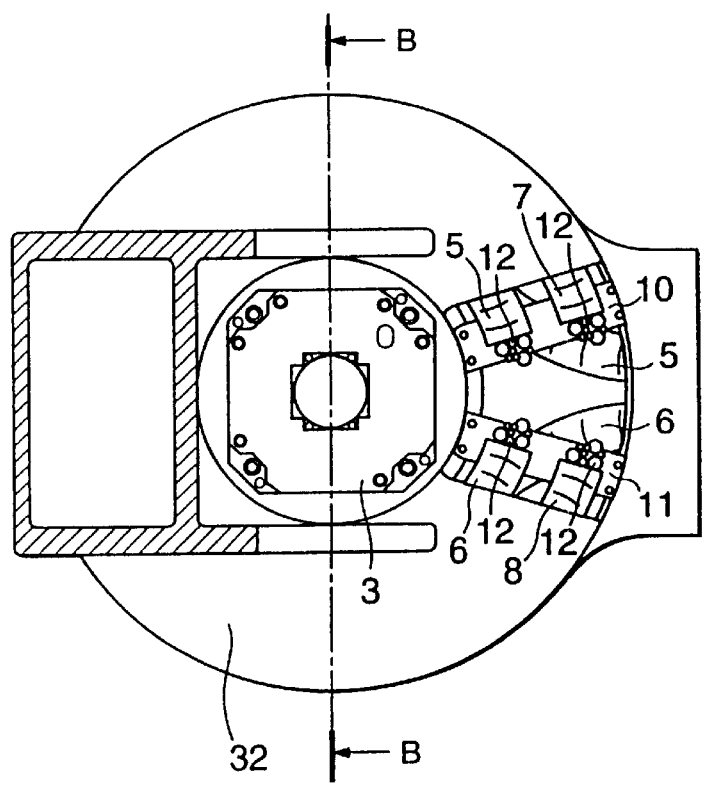
FIG. 2 is a plan view as viewed from the direction of arrow P shown in FIG. 1.
Figure 4:
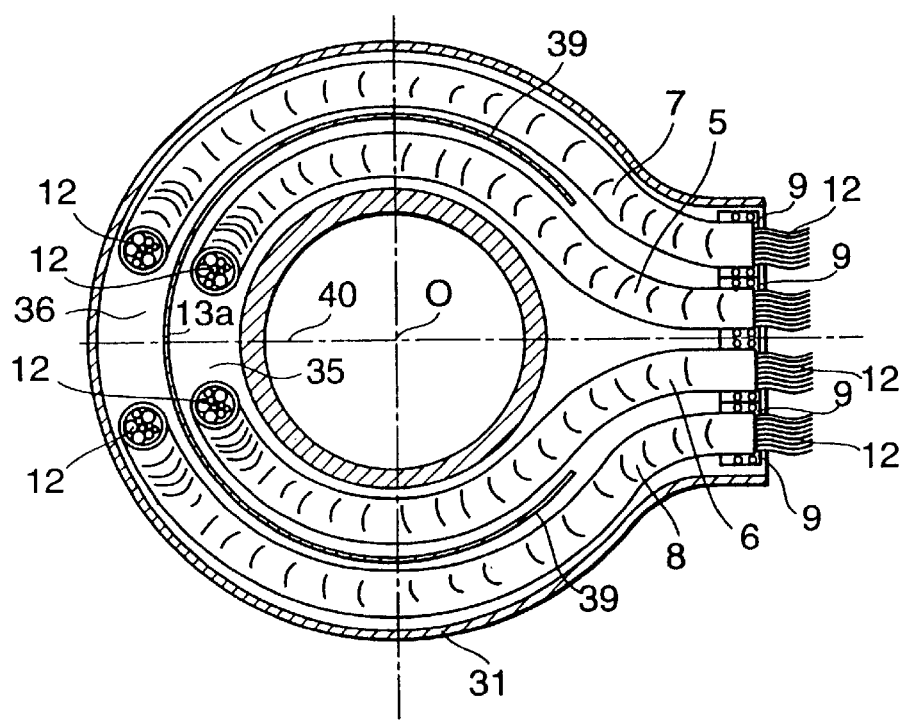
FIG.4 is a plain view which is a cross section view along C—C line shown in FIG. 1.

As seen in FIGS. 1 and 4, four coilspring conduits 5, 6, 7, 8 enter into the two circular spaces 35,36 from right end of the base 31. Each one end of conduits 5, 6, 7, 8 is secured on the interior wall of the base 31 by a clamp 9. Each conduit extends halfway along a center of one of the circular spaces 35,36, and then is turned back to form an U-shaped configuration 14 and returns along the center of the opposite the circular spaces 37,38 contactably on the ceiling wall of the rotary base 32, and the other ends of conduits are secured on the interior wall of the rotary base 32 by clamps 10,11 respectively (FIG. 2).

As best seen in FIG. 4, the coilspring conduits 5, 6, 7, 8 are divided into two groups 5,6 and 7, 8. The conduits 5, 6 and the conduits 7, 8 are so arranged on both half sides of the circular spaces 35, 36 to extend in a symmetrically way with respect to a crossing line 40 passing on the rotation axis 0 of the rotary base 32. Thus, a plurality of bundles 12 containing a plurality of electric cables 12*a* and/or pipe(s) 12*b* each are protected by the coilspring conduits 5, 6, 7, 8 and kept so that neighboring conduits do not interfere with each other during the rotating movement of the rotary base 32.

By such an arrangement, since the first and second spaces 33,34 are each divided into a plurality of circular spaces 35, 36, 37, 38 by the partition wall 13*a*, 13*b*, the numbers of cables 12*a* and/or pipe(s) 12*b* installed into each circular space is similarly divided into small numbers, resulting that the radius of curvatures of the turned back portions forming U-shaped configurations 14 in the first and second spaces can be made small, thereby a supporting device for wiring and piping of an industrial robot is made to be adapted to house an increased number of electric cables and pipes without making a robot body including its base and rotary base to have a high vertical height and a large-size, resulting that it prevents an increase of manufacturing material cost, and contributes to provide low cost robots.

In operation, since the two groups of the conduits 5,6 and 7,8 are so arranged on both half sides of the circular spaces 35,36 that they extend in a symmetrically way with respect to the crossing line 40 passing on the rotation axis 0 of the rotary base 32, the half of the coilspring conduits are made to go forward while bended or turned up with an adequate curvature, further, at the same time, the rest of the coilspring conduits are made to go backward while similarly bended or turned up, resulting that the neighboring coilspring conduits housing the bundles do not interfere with each other while the rotary base 32 rotates, and the bundles 12 housed in the coilspring conduits are pressed with a stable load and prevented from troubles arising out of wiring and piping.

Figure 3:
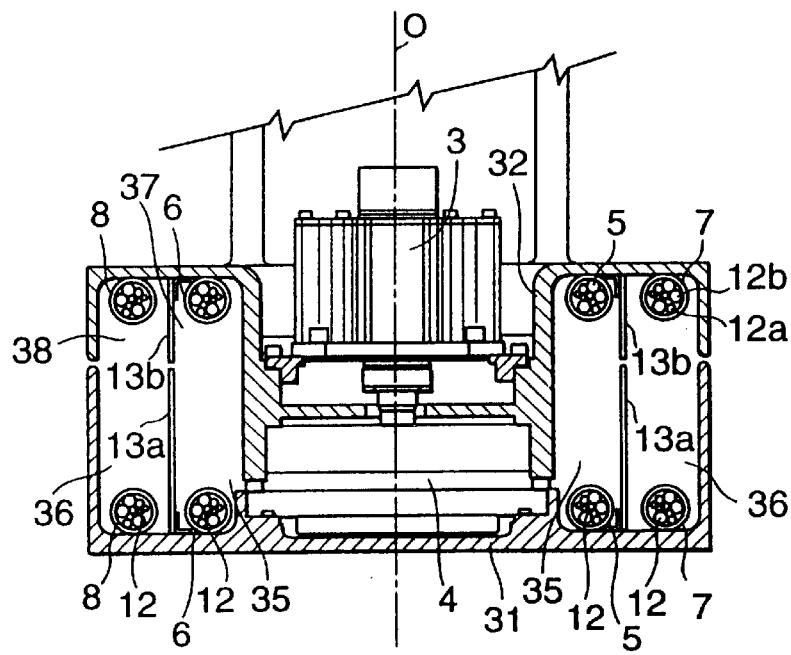
FIG. 3 is a cross section view along B—B line shown in FIG. 2.
Figure 5:
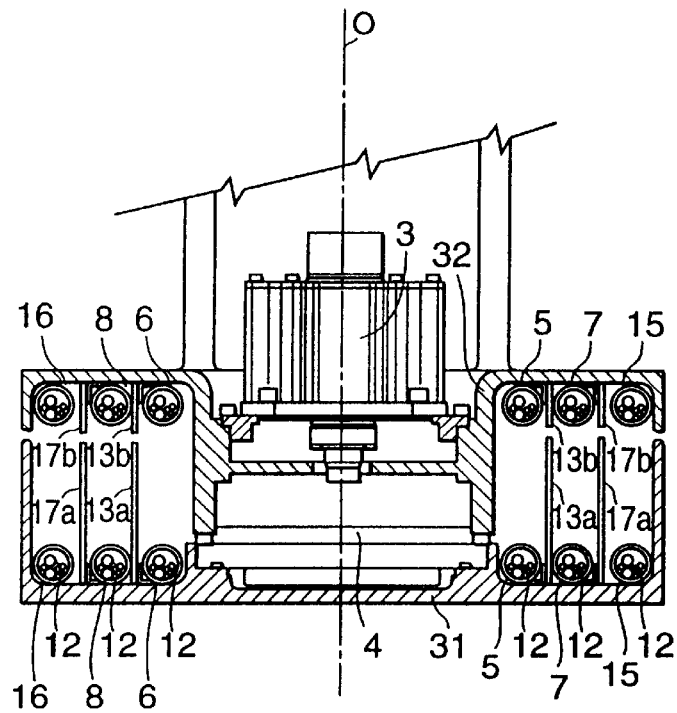
FIG. 5 is a cross section view which is a modification shown in FIG. 3, wherein each first and second spaces are divided into three circular spaces to install six rows of coilspring conduits.

FIG. 5 is a cross section view which is a modification from that of shown in FIG. 3, wherein each first and second spaces are divided into six circular spaces by four partition walls 13a, 13b, 17a, 17b to install six rows of coilspring conduits 6, 8, 16, 5, 7, 15 each housing the bundles 12 containing a plurality of electric cables 12a and/or pipe(s) 12b. This arrangement is adapted to apply to a supporting device which houses more increased numbers of the electric cables and pipes.

Figure 6:
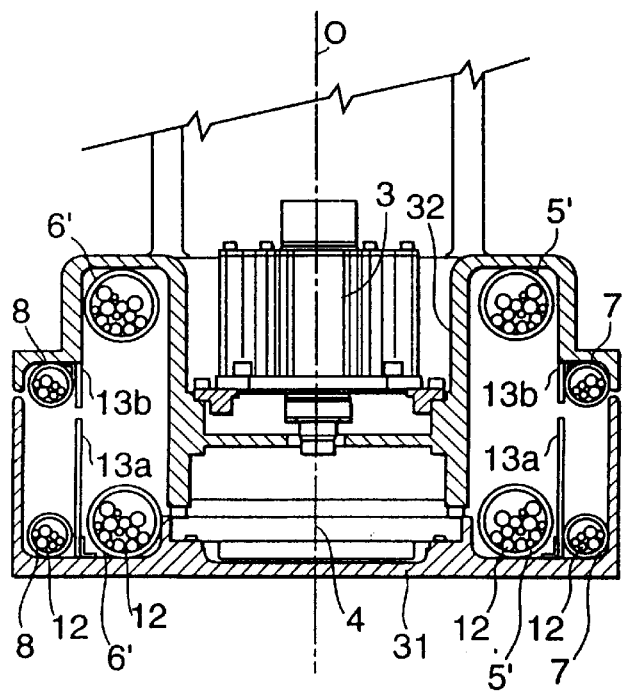
FIG. 6 is a similar cross section view which is a further modification shown in FIGS. 3 and 5, wherein the external diameters of the two rows of coilspring conduits differ from that of the other two rows.
Figure 7:
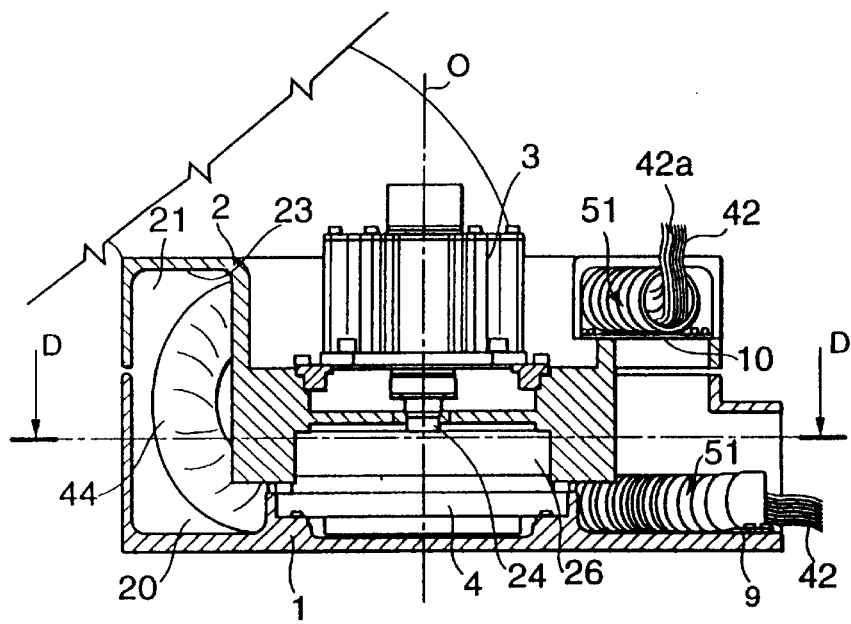
FIG. 7 is an elevational partial cross section view showing a conventional supporting device for wiring and piping of an industrial robot.
Figure 8:
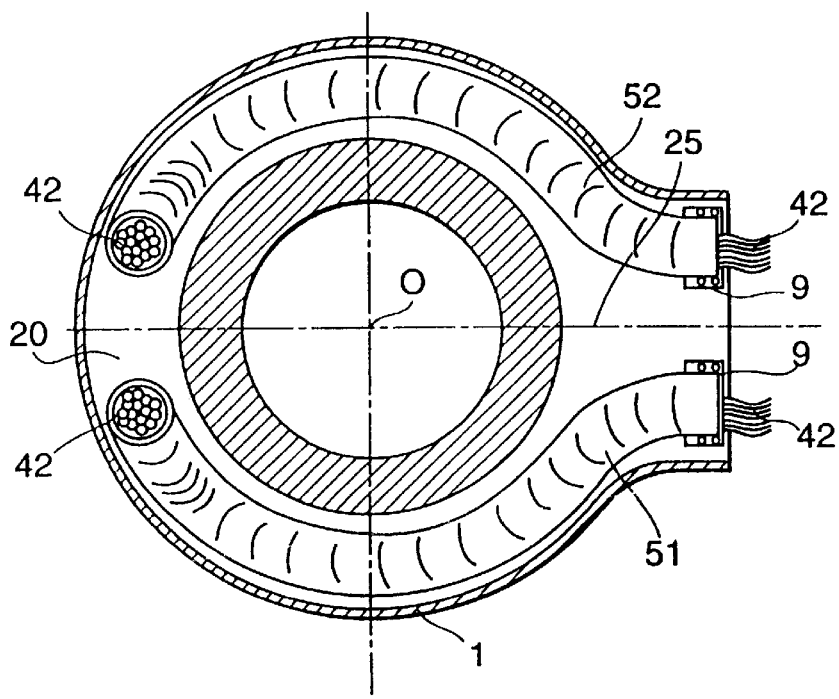
FIG. 8 is a plain view which is a cross section view along D—D line shown in FIG. 7.

FIG. 6 is a similar cross section view which is a further modification shown in FIG. 3 wherein the external diameters of inner two rows of coilspring conduits 6',5' differ from that of the outer two rows of coilspring conduits 8,7. This arrangement is able to apply to a supporting device which is adapted to house electric cables and pipes in interior spaces of a robot body having a variety of sizes.

The invention has been described in an illustrative manner and it is to be understood that within the scope of the appended claims, the invention may be practiced otherwise than as specifically described. For example, in the supporting device for wiring and piping of the preferred embodiments, the rotation axis 0 of the rotary base 32 of the robot has been described as of vertical axis, however, the supporting device of present invention may be applicable to a robot having a horizontal rotation axis. Further, the supporting device of present invention may be applicable to other particular joints other than that of the base and rotary base, such as a joint between an upper and a lower arm of a vertical articulated robot.

What is claimed is:

1. A supporting device for wiring and piping installed in an industrial robot including a base having a first space and a rotary base having a second space and rotatably mounted on the base;

wherein the first space is divided into a plurality of circular spaces by at least one first axial partition wall having a portion extending along a concentric circle with respect to the rotation axis of the rotary base and one end of which is fixed on a bottom wall of the rotary base; and the second space is divided into a plurality of circular spaces by at least one second axial partition wall oppositely disposed with respect to the first axial partition wall via a small space therebetween and end of which is fixed on a ceiling wall of the rotary base; and a plurality of bundles containing a plurality of electric cables and/or pipe(s) so installed in each of the circular spaces so that the one end of each bundle is secured on the interior wall of the base and each bundle extends halfway along a center of one of the circular spaces of the base, and then is turned back to form an U-shaped configuration and returns along a center of the opposite circular space of the rotary base contactably on the ceiling wall thereof, and the other end of each bundle is secured on the rotary base.

2. The supporting device of claim 1 wherein each bundle containing a plurality of electric cables and/or pipe(s) is housed in a flexible conduit respectively.

3. The supporting device of claim 1 wherein each bundle containing a plurality of electric cables and/or pipe(s) is housed in a coilspring conduit respectively, further, each of the coilspring conduits are so arranged on both half sides of each circular space that they extend in a symmetrically way with respect to a crossing line passing on the rotation axis of the rotary base.

* * * * *